(12) United States Patent
Ishikawa

(10) Patent No.: US 6,956,674 B1
(45) Date of Patent: Oct. 18, 2005

(54) IMAGE PROCESSOR CAPABLE OF REDUCING GRADATION AT HIGH SPEED

(75) Inventor: Atsushi Ishikawa, Anjyo (JP)

(73) Assignee: Minolta Co., Ltd., Osaka (JP)

( * ) Notice: Subject to any disclaimer, the term of this patent is extended or adjusted under 35 U.S.C. 154(b) by 951 days.

(21) Appl. No.: 09/692,052

(22) Filed: Oct. 20, 2000

(30) Foreign Application Priority Data

Oct. 21, 1999 (JP) ............................................ 11-299437

(51) Int. Cl.[7] ............................ H04N 1/40; H04N 1/405
(52) U.S. Cl. .................................. 358/3.03; 358/3.13
(58) Field of Search ................................ 358/1.9, 3.01, 358/3.03, 3.04, 3.1, 3.13, 3.14, 3.21, 3.06, 3.2; 382/166, 252, 251, 237; 345/600, 690–697; 341/56

(56) References Cited

U.S. PATENT DOCUMENTS

| 5,768,425 A | * | 6/1998 | Praveen et al. ............ 358/3.22 |
| 5,870,503 A | * | 2/1999 | Kumashiro ................. 382/252 |
| 6,369,912 B1 | * | 4/2002 | Kumashiro ................. 382/252 |

FOREIGN PATENT DOCUMENTS

| JP | 6-98157 | 4/1994 |
| JP | 6-233122 | 8/1994 |
| JP | 11-175712 | 7/1999 |

* cited by examiner

Primary Examiner—Scott A. Rogers
(74) Attorney, Agent, or Firm—Buchanan Ingersoll PC

(57) ABSTRACT

An image processor employing error diffision is provided with a multivalued dithering part, for reducing the bit number of computing in a feedback loop for errors. Thus, an operation can be performed at a high speed while the capacity of an error storage memory can be reduced.

16 Claims, 4 Drawing Sheets

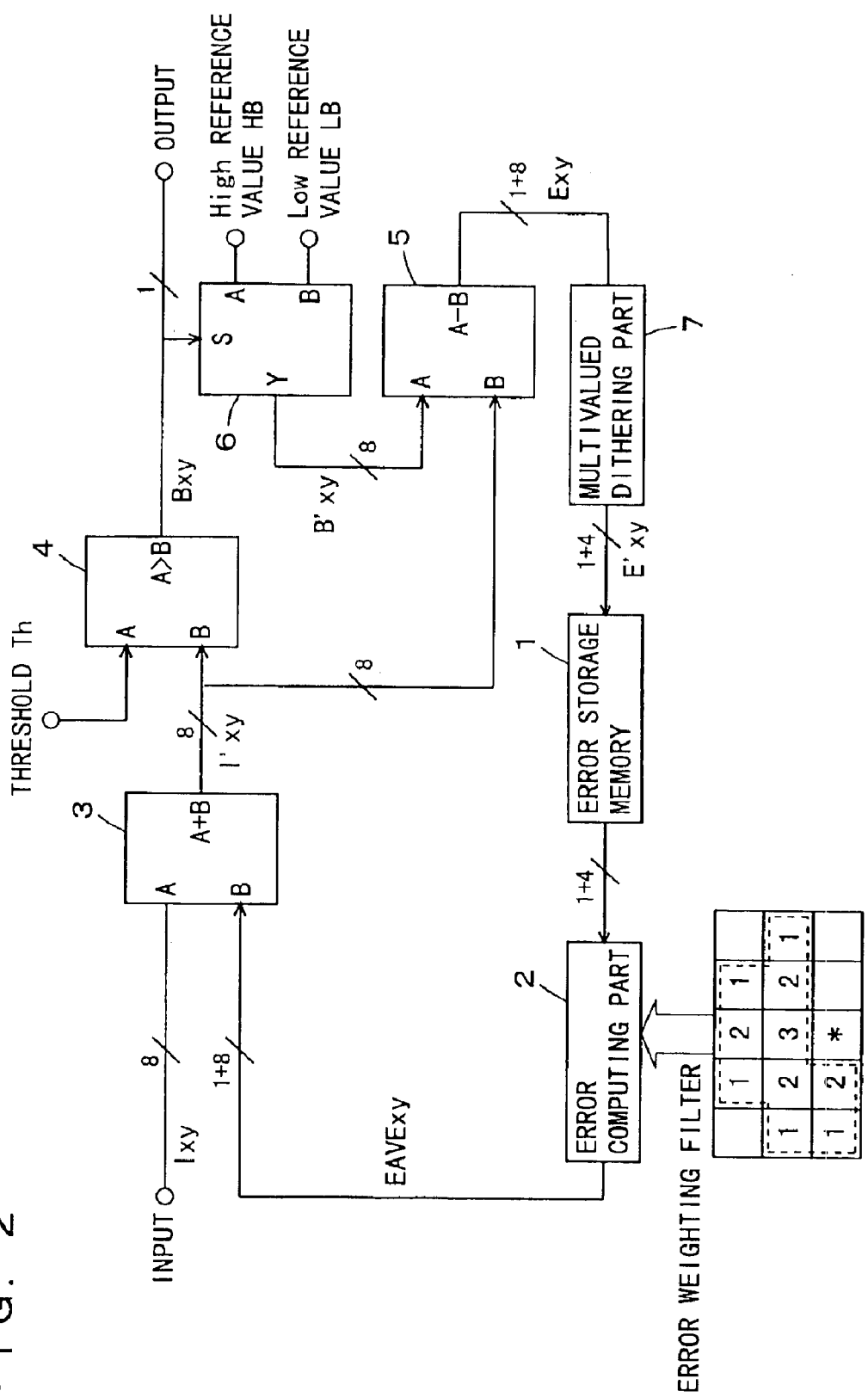
F I G. 2

IMAGE PROCESSOR CAPABLE OF REDUCING GRADATION AT HIGH SPEED

This application is based on application No. 11-299437 filed in Japan, the contents of which are hereby incorporated by reference.

BACKGROUND OF THE INVENTION

1. Field of the Invention

The present invention relates to an image processor, and more particularly, it relates to an image processor converting M-valued image data of a target pixel to N (M>N)-valued image data (N-arization) on the basis of error diffusion.

2. Description of the Related Art

An image processor utilizing error diffusion is known in general. General error diffusion is performed on the basis of the following equation.

Assuming that $I_{xy}$ ($0 \leq I_{xy} \leq 1$) represents input image data of a pixel (target pixel) having coordinates (x, y) and $B_{xy}$ (0 or 1) represents output two-valued image data (N-valued image data), two-valued error data $E_{xy}$ is expressed as follows:

$$E_{xy} = I_{xy} - B_{xy} \qquad (1)$$

According to the error diffusion, the image data $I_{xy}$ of the target pixel is corrected with an average weighted error $EAVE_{xy}$ of two-valued errors of peripheral pixels thereof, in order to reduce the two-valued error data $E_{xy}$ on the average. The average weighted error $EAVE_{xy}$ is obtained as follows:

$$EAVE_{xy} = \Sigma K_{ij} \times E_{ij} \qquad (2)$$

In general, the weighting factor $K_{ij}$ is increased as approaching the target pixel. As shown in FIG. 3, a filter computes the average weighted error $EAVE_{xy}$ generally with a matrix size i of five pixels along the main scanning direction of the filter and a matrix size j of two to three pixels along the subscanning direction. The weighting factor $K_{ij}$ is increased as approaching the target pixel (denoted by "*" in FIG. 3).

Corrected image data $I'_{xy}$ of the target pixel is expressed as follows:

$$I'_{xy} = I_{xy} + EAVE_{xy} \qquad (3)$$

The obtained corrected image data $I'_{xy}$ is binarized with a prescribed threshold Th.

$$B_{xy} = 1 \text{(when } I'_{xy} \geq Th\text{)}$$
$$B_{xy} = 0 \text{(when } I'_{xy} < Th\text{)} \qquad (4)$$

The two-valued error data $E_{xy}$ is computed from the corrected image data $I'_{xy}$ and a reference value $B'_{xy}$ obtained on the basis of the result of binarization (two-valued image data).

$$E_{xy} = I'_{xy} - B'_{xy} \qquad (5)$$

In general, the reference value $B'_{xy}$ is:

$$B'_{xy} = HB \text{(when } B_{xy} = 1\text{)}$$
$$B'_{xy} = LB \text{(when } B_{xy} = 0\text{)} \qquad (6)$$

The reference values HB and LB are given by the upper limit (=1) and the lower limit (=0) of the dynamic range of the pixel respectively.

FIG. 4 is a block diagram showing the structure of a conventional image processor employing error diffusion.

Referring to FIG. 4, the image processor is formed by an error storage memory 1, an error computing part (product-sum operation part) 2 computing errors on the basis of an error weighting filter, an adder 3, a comparator 4, a subtracter 5 and a selector 6.

The error storage memory 1 stores two-valued errors necessary for computing the average weighted error $EAVE_{xy}$. The error storage memory 1 outputs the two-valued errors to the error computing part 2. The error computing part 2 performs a product-sum operation of the weighting factor $K_{ij}$ and the errors for computing the average weighted error $EAVE_{xy}$ and outputting the same to the adder 3 (the processing of the above equation (2)).

The adder 3 adds the image data $I_{xy}$ of the target pixel with the average weighted error $EAVE_{xy}$ of the peripheral pixels and computes the corrected image data $I'_{xy}$. Then, the adder 3 outputs the corrected image data $I'_{xy}$ to the comparator 4 for binarization and the subtracter 5 for error computing (the processing of the above equation (3)).

The comparator 4 compares the corrected image data $I'_{xy}$ with the prescribed threshold Th (e.g. "127") to obtain the two-valued output $B_{xy}$ as a result and outputs the result of the comparison to the selector 6 for selecting the reference value (the processing of the above equation (4)).

The subtracter 5 subtracts the corrected image data $I'_{xy}$ from the reference value $B'_{xy}$ and outputs the obtained two-valued error data $E_{xy}$ to the error storage memory 1 (the processing of the above equation (5)).

The selector 6 selects the reference value (HB or LB) for computing the two-valued error data $E_{xy}$ from the two-valued image data $B_{xy}$, and outputs the selected reference value $B'_{xy}$ to the subtracter 5.

Referring to FIG. 4, the error computing part 2 computing the average weighted error $EAVE_{xy}$ of the peripheral pixels, the adder 3 adding the average weighted error $EAVE_{xy}$ to the input image data $I_{xy}$ and computing the corrected image data $I'_{xy}$, the comparator 4 comparing the corrected image data $I'_{xy}$ with the threshold Th and computing the two-valued image data $B_{xy}$, the selector 6 for selecting the reference value $B'_{xy}$ from the two-valued image data $B_{xy}$ and the subtracter 5 computing the two-valued error data $E_{xy}$ from the corrected image data $I'_{xy}$ and the reference value $B'_{xy}$ form a feedback loop of errors.

In order to binarize the image data $I_{xy}$ of the target pixel, the average weighted error $EAVE_{xy}$ of the peripheral pixels must be operated inclusive of a two-valued error $E_{x-1,y}$ of a precedently binarized pixel. In other words, the processing of the above equations (2) to (6) must be entirely performed in a cycle processing a single pixel. If the processing in the feedback loop is performed at a slow speed, therefore, the processing speed of the overall image processor is reduced.

SUMMARY OF THE INVENTION

An object of the present invention is to provide an image processor having a high processing speed.

In order to attain the aforementioned object, an image processor converting M-valued image data of a target pixel to N (M>N)-valued image data by error diffusion according to an aspect of the present invention comprises a correction part correcting the M-valued image data of the target pixel with an N-valued error resulting from N-arization of peripheral pixels for the target pixel and generating corrected image data, an N-arization part comparing the corrected image data with a threshold and converting the corrected image data to N-valued image data of the target pixel and an output part outputting an N-valued error having a smaller bit number than the corrected image data by multivalued dithering on the basis of the corrected image data and the N-valued image data.

According to another aspect of the present invention, an image processor converting M-valued image data of a target pixel to N (M>N)-valued image data by error diffusion comprises a correction part correcting the M-valued image data of the target pixel with an N-valued error resulting from N-arization of peripheral pixels for the target pixel and generating corrected image data, an N-arization part comparing the corrected image data with a threshold and converting the corrected image data to N-valued image data of the target pixel and an output part outputting an N-valued error having a smaller bit number than the corrected image data on the basis of the corrected image data and the N-valued image data.

According to still another aspect of the present invention, an image processing method of converting M-valued image data of a target pixel to N (M>N)-valued image data by error diffusion comprises steps of correcting the M-valued image data of the target pixel with an N-valued error resulting from N-arization of peripheral pixels for the target pixel and generating corrected image data, comparing the corrected image data with a threshold and converting the corrected image data to N-valued image data of the target pixel and outputting an N-valued error having a smaller bit number than the corrected image data on the basis of the corrected image data and the N-valued image data.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram showing the structure of an image processor according to a second embodiment of the present invention;

DESCRIPTION OF THE PREFERRED EMBODIMENTS

Figure 1:
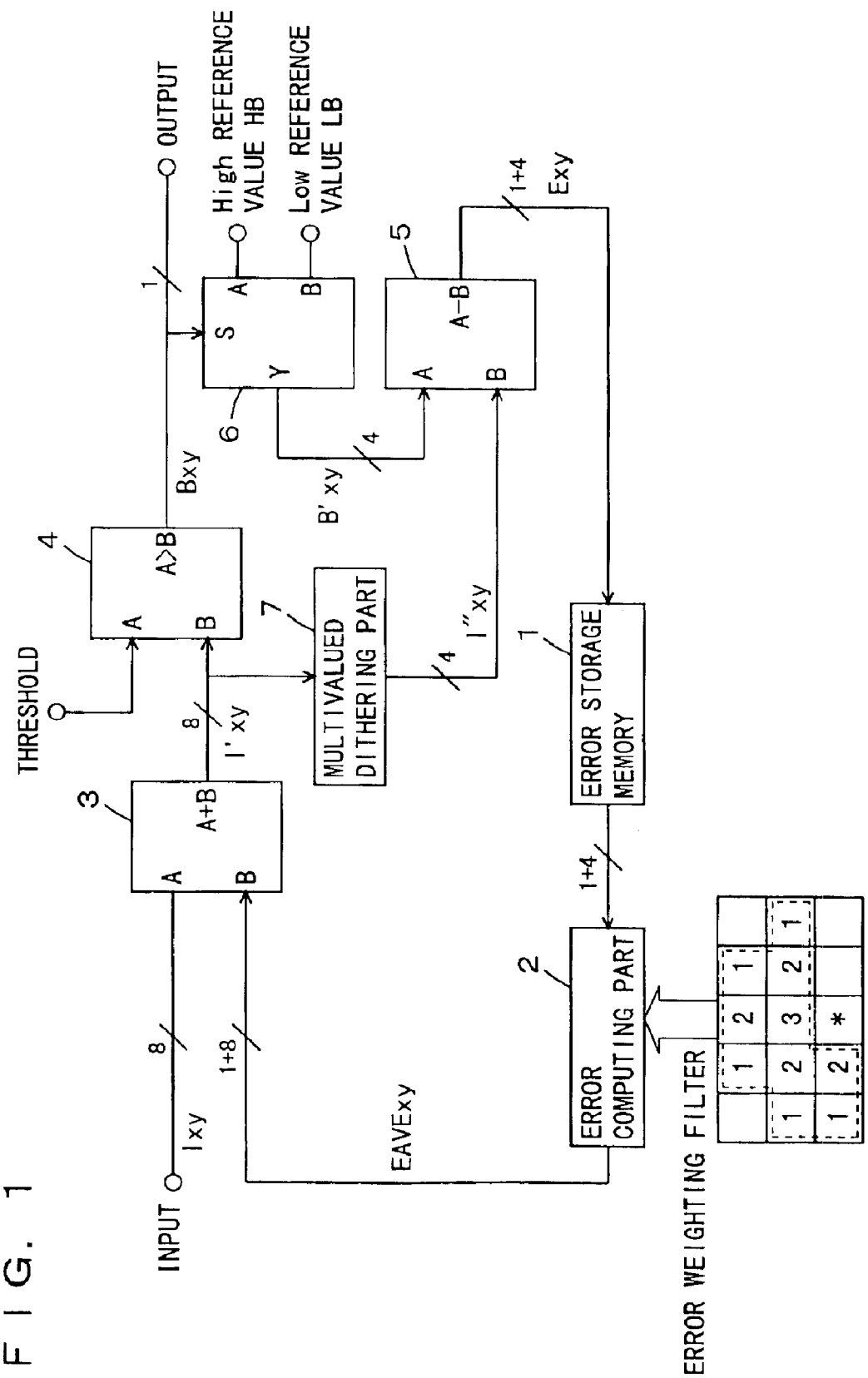
FIG. 1 is a block diagram showing the structure of an image processor according to a first embodiment of the present invention.
Figure 3:
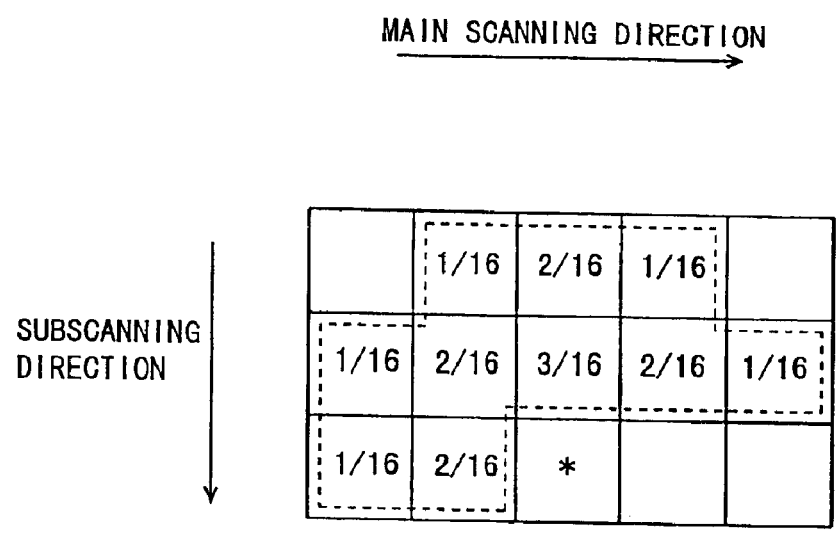
FIG. 3 illustrates the structure of an error weighting filter.
Figure 4:
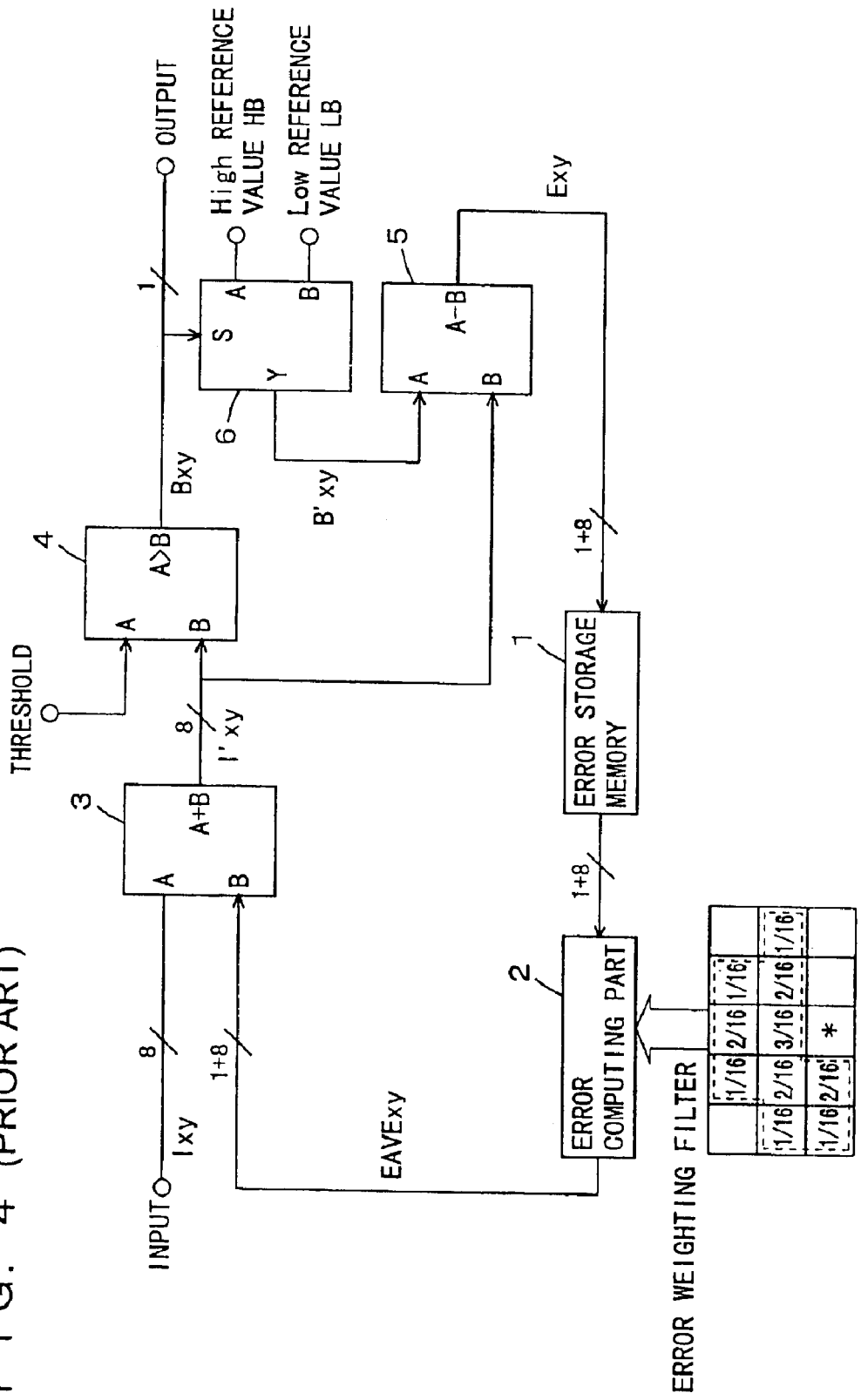
FIG. 4 is a block diagram showing the structure of a conventional image processor.

FIG. 1 is a block diagram showing the structure of an image processor according to a first embodiment of the present invention. The difference between this image processor and the image processor shown in FIG. 4 is now described.

According to this embodiment, a multivalued dithering part 7 is provided between an adder 3 and a subtracter 5. The multivalued dithering part 7 bit-reduces corrected image data $I'_{xy}$ by multivalued dithering, and outputs bit-reduced corrected image data $I''_{xy}$ to the subtracter 5.

The multivalued dithering part 7 applies dithering to lower L bits of the corrected image data $I'_{xy}$ consisting of K bits and converts the data of the lower L bits to 1-bit data. Thus, the multivalued dithering part 7 converts the corrected image data $I'_{xy}$ consisting of K bits to the bit-reduced corrected image data $I''_{xy}$.

The dithering is a pseudo-gradation method (area gradation method) expressing gradation by a set of dots similarly to the error diffusion, and hence the quantity of information per dot is reduced due to the bit reduction while the quantity of information of the original image is preserved by the set of the dots.

A selector 6 outputs one of reference values HB and LB in response to a result $B_{xy}$ of binarization. The reference values HB and LB have the same bit number as the bit-reduced corrected image data $I''_{xy}$.

The subtracter 5 subtracts a reference value $B'_{xy}$ from the bit-reduced corrected image data $I''_{xy}$ and outputs the result as two-valued error data $E_{xy}$. The bit number of the two-valued error data $E_{xy}$, requiring a bit indicating +/−, is larger than that of the bit-reduced corrected image data $I''_{xy}$ by 1. An error storage memory 1 stores the value of the two-valued error data $E_{xy}$.

An error computing part 2 employs an error weighting filter and outputs an average weighted error $EAVE_{xy}$ with reference to the contents of the error storage memory 1. The error computing part 2 adjusts weighting factors of the error weighting filter thereby matching the bit number of the average weighted error $EAVE_{xy}$ with that of pixel data $I_{xy}$ of a target pixel. The average weighted error $EAVE_{xy}$ is provided with the bit indicating +/−, and hence the bit number of the average weighted error $EAVE_{xy}$ is larger than that of the pixel data $I_{xy}$ of the target pixel by 1.

More specifically, the pixel data $I_{xy}$ of the target pixel has eight bits, the corrected image data $I'_{xy}$ has eight bits, the two-valued image data $B_{xy}$ has one bit, the bit-reduced corrected image data $I''_{xy}$ has four bits, the two-valued error data $E_{xy}$ has 1 (indicating +/−)+4 bits, and the average weighted error $EAVE_{xy}$ has 1 (indicating +/−)+8 bits.

According to this embodiment, as hereinabove described, the bit number of computing between the multivalued dithering part 7 and the error computing part 2 can be reduced as compared with the prior art. Thus, high-speed computing can be performed for providing an image processor having a high processing speed.

The capacity of the error storage memory 1 for storing error data can be remarkably reduced by reducing the bit number of t error data.

The sum of the weighting factors of the error weighting filter shown in FIG. 1 is $16=2^4$. When the multivalued dithering part 7 reduces four bits, therefore, no division (by "16" in FIG. 4, for example) is required for a product-sum operation of peripheral pixels, to result in no operation error.

Referring to FIG. 1, for example, the error computing part 2 may simply multiply the output from the error storage memory 1 by any of the numerical values "1" to "3" and add the sum, whereby a high-speed operation can be performed.

When a relation $m=2^n$ holds between the number n of bit reduction by the multivalued dithering and the sum m of the weighting factors, no division is required.

FIG. 2 is a block diagram showing the structure of an image processor according to a second embodiment o the present invention.

While the image processor according to the first embodiment reduces the bit number of the corrected image data $I'_{xy}$ by multivalued dithering and thereafter computes an N-valued error, the image processor according to the second embodiment reduces the bit number of difference data $E_{xy}$ between corrected image data $I'_{xy}$ and a reference value based on N-valued image data by a multivalued dithering part 7. The bit number of error data can be reduced also by reducing the bit number of the two-valued error $E_{xy}$, whereby a load on a product-sum operation can be reduced and the speed of a feedback loop for errors can be increased.

While each of the above embodiments has been described with reference to the processing of converting multivalued image data to two-valued image data, the present invention is not restricted to this but is also applicable to image processing converting M-valued image data to N (M>N)-valued image data on the basis of error diffusion. In order to reduce the bit number, simple binarization or error diffusion may be employed in place of the multivalued dithering.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processor converting M-valued image data of a target pixel to N (M>N)-valued image data by error diffusion, comprising:

correction means correcting said M-valued image data of said target pixel with reference to an N-valued error resulting from N-arization of peripheral pixels for said target pixel and generating corrected image data;

N-arization means comparing said corrected image data with a threshold and converting said corrected image data to N-valued image data of said target pixel; and output means performing multivalued dithering on said corrected image data and outputting an N-valued error having a smaller bit number than said corrected image data on the basis of said corrected image data and said N-valued image data.

2. The image processor according to claim 1, further comprising:

storage means storing said N-valued error output from said output means.

3. The image processor according to claim 2, wherein said correction means computes an average weighted error on the basis of said N-valued error of said peripheral pixels for said target pixel stored in said storage means and weighting factors, and performs correction on the basis of said average weighted error.

4. The image processor according to claim 3, wherein a relation $m=2^n$ holds between the number n of bit reduction by said multivalued dithering and the sum m of said weighting factors.

5. The image processor according to claim 1, wherein said output means generates said N-valued error on the basis of said corrected image data subjected to said multivalued dithering and said n-valued image data.

6. An image processor converting M-valued image data of a target pixel to N (M>N)-valued image data by error diffusion, comprising:

correction means correcting said M-valued image data of said target pixel with reference to an N-valued error resulting from N-arization of peripheral pixels for said target pixel and generating corrected image data;

N-arization means comparing said corrected image data with a threshold and converting said corrected image data to N-valued image data of said target pixel; and output means outputting an N-valued error having a smaller bit number than said corrected image data by multivalued dithering on the basis of said corrected image data and said N-valued image data, wherein said output means includes means performing multivalued dithering on difference data between said corrected image data and data based on said N-valued image data.

7. An image processing method of converting M-valued image data of a target pixel to N (M>N)-valued image data by error diffusion, comprising steps of:

correcting said M-valued image data of said target pixel with reference to an N-valued error resulting from N-arization of peripheral pixels for said target pixel and generating corrected image data;

comparing said corrected image data with a threshold and converting said corrected image data to N-valued image data of said target pixel;

performing multivalue dithering on said corrected image; and outputting an N-valued error having a smaller bit number than said corrected image data on the basis of said corrected image data and said N-valued image data.

8. The image processing method according to claim 7, further including:

a step of computing an average weighted error on the basis of said N-valued error of said peripheral pixels for said target pixel and weighting factors, for generating said corrected image data on the basis of said average weighted error.

9. The image processing method according to claim 7, wherein said N-valued error is generated on the basis of said corrected image data subjected to said multivalued dithering and said N-valued image data.

10. An image processing method of converting M-valued image data of a target pixel to N (M>N)-valued image data by error diffusion, comprising steps of:

correcting said M-valued image data of said target pixel with reference to an N-valued error resulting from N-arization of peripheral pixels for said target pixel and generating corrected image data;

comparing said corrected image data with a threshold and converting said corrected image data to N-valued image data of said target pixel;

outputting an N-valued error having a smaller bit number than said corrected image data on the basis of said corrected image data and said N-valued image data; and performing multivalued dithering on difference data between said corrected image data and data based on said N-valued image data.

11. An image processor converting M-valued image data of a target pixel to N (M>N)-valued image data by error diffusion, comprising:

correction device correcting said M-valued image data of said target pixel with reference to an N-valued error resulting from N-arization of peripheral pixels for said target pixel and generating corrected image data;

N-arization device comparing said corrected image data with a threshold and converting said corrected image data to N-valued image data of said target pixel; and output device performing multivalued dithering on said corrected image data and outputting an N-valued error having a smaller bit number than said corrected image data on the basis of said corrected image data and said N-valued image data.

12. The image processor according to claim 11, further comprising:

storage device storing said N-valued error output from said output device.

13. The image processor according to claim 12, wherein said correction device computes an average weighted error on the basis of said N-valued error of said peripheral pixels for said target pixel stored in said storage device and weighting factors, and performs correction on the basis of said average weighted error.

14. The image processor according to claim 13, wherein a relation $m=2^n$ holds between the number n of bit reduction by said multivalued dithering and the sum m of said weighting factors.

15. The image processor according to claim 11, wherein said output device generates said N-valued error on the basis of said corrected image data subjected to said multivalued dithering and said n-valued image data.

16. An image processor converting M-valued image data of a target pixel to N (M>N)-valued image data by error diffusion, comprising:

correction part correcting said M-valued image data of said target pixel with reference to an N-valued error resulting from N-arization of peripheral pixels for said target pixel and generating corrected image data;

N-arization part comparing said corrected image data with a threshold and converting said corrected image data to N-valued image data of said target pixel; and output part outputting an N-valued error having a smaller bit number than said corrected image data by multivalued dithering on the basis of said corrected image data and said N-valued image data, wherein said output part includes multivalued determining part performing multivalued dithering on difference data between said corrected image data and data based on said N-valued image data.

* * * * *